United States Patent [19]

Hatamura

[11] Patent Number: 5,894,507
[45] Date of Patent: Apr. 13, 1999

[54] TELEPHONE WITH FUNCTION FOR ADDING AND REMOVING REGIONAL NUMBERS FROM TELEPHONE NUMBERS TO BE DIALED

[75] Inventor: Junji Hatamura, Nagoya, Japan

[73] Assignee: Brother Kogyo Kabushiki Kaisha, Nagoya, Japan

[21] Appl. No.: 08/655,809

[22] Filed: May 31, 1996

[30] Foreign Application Priority Data

Jun. 6, 1995 [JP] Japan ................................. 7-139326

[51] Int. Cl.⁶ .......................... H04M 11/00; H04M 1/27
[52] U.S. Cl. ...................... 379/93.23; 379/142; 379/354; 379/67
[58] Field of Search .................... 379/96, 142, 67, 379/88, 89, 354–357, 93.17, 93.18, 93.23

[56] References Cited

U.S. PATENT DOCUMENTS

| | | | |
|---|---|---|---|
| 5,283,818 | 2/1994 | Klausner et al. | 379/142 |
| 5,422,938 | 6/1995 | Yamanishi | 379/142 |
| 5,528,680 | 6/1996 | Karpicke | 379/142 |

FOREIGN PATENT DOCUMENTS

A-57-23354  2/1982  Japan.

*Primary Examiner*—Wing F. Chan
*Attorney, Agent, or Firm*—Oliff & Berridge, PLC

[57] ABSTRACT

A telephone including a telephone number memory for storing telephone numbers; a present regional number unit for storing a present regional number of the telephone itself; a telephone number selection unit for selecting, from the telephone numbers stored in the telephone number memory, a telephone number indicated by a user; a regional number removal unit for removing a regional number portion from the telephone number selected by the telephone number selection unit when the regional number portion matches the present regional number stored in the present regional number memory; and a caller unit for performing calling processes using the telephone number after the telephone number is processed by the regional number removal unit.

19 Claims, 11 Drawing Sheets

TELEPHONE WITH FUNCTION FOR ADDING AND REMOVING REGIONAL NUMBERS FROM TELEPHONE NUMBERS TO BE DIALED

BACKGROUND OF THE INVENTION

1. Field of the Invention

The present invention relates to a telephone capable of receiving a caller's telephone number in a caller-ID signal or by some other method.

2. Description of the Related Art

Japanese Patent Application (KOKAI) No. SHO-57-23354 describes a telephone capable of storing data representing telephone numbers or names of parties frequently called by the user of the telephone. When the user indicates a desire to place a telephone call to one of these parties, the corresponding telephone number and the like are displayed on a display such as an LCD of the telephone. The user selects the party he or she wishes to call and the telephone automatically calls the selected telephone number.

As a prevention of prank calls, telephone switchboards in the United States provide a service to subscribers wherein callers' telephone numbers are displayed on a liquid crystal display (LCD) of the subscriber's telephone before the recipient of the incoming call picks up the handset. In order to provide this service, a switchboard transmits an FSKed (i.e., subjected to frequency shift keying) signal with a caller-ID number along with the ringing signal. The caller-ID number includes the telephone number of the caller's remote telephone. When the recipient receives the caller-ID number, the caller's telephone number is displayed on the LCD.

Those caller-ID numbers that a user receives while not at home can be stored in list form. In this case, upon returning home, the user can conveniently call one of the telephone numbers by selecting a desired one from the list in the manner described in Japanese Patent Application (KOKAI) No. SHO-57-23354. When telephone numbers are automatically stored in this manner, a user need not dial the telephone number of the desired party, but need merely select the desired party from the list, whereupon the telephone will automatically dial the desired telephone number.

SUMMARY OF THE INVENTION

However, caller-IDs and other data for registering telephone numbers must also include data for a regional number, which allows calling the telephone number regardless of from what region a telephone call is placed. Examples of regional numbers include city numbers of Japan, area codes of the United States, and country numbers. Examples of country numbers include "81" for dialing to Japan and "1" for dialing to the United States.

In the above situation, when a user selects a telephone number of a remote telephone within the same region as the user, the telephone automatically dials the telephone number as registered and so will also dial the regional number even if the telephone from which the call is being placed is in the same region as the telephone of the party being called. In some regions of the world and with some types of switchboard systems, when the regional number of the same region is unnecessarily dialed in this manner, the telephone circuit will not be connected or, if connected, will result in higher telephone charges than if the regional number had not been dialed.

It is an objective of the present invention to overcome the above-described problem and provide a telephone capable of using prestored telephone numbers to automatically call a remote device from any region.

In order to achieve the above-described objectives, a telephone according to the present invention includes a telephone number memory for storing telephone numbers; a present regional number memory for storing a present regional number of the telephone itself; telephone number selection means for selecting, from the telephone numbers stored in the telephone number memory, a telephone number indicated by a user; regional number removal means for removing a regional number portion from the telephone number selected by the telephone number selection means when the regional number portion matches the present regional number stored in the present regional number memory; and caller means for performing calling processes using the telephone number after the telephone number is processed by the regional number removal means.

According to this aspect of the invention, the telephone number memory stores telephone numbers and the present regional number memory stores a regional number for the regional number for the telephone itself. The telephone number selection means selects, from the telephone numbers stored in the telephone number memory, a telephone number corresponding to an indication from a user. When the telephone number selected by the telephone number selection means includes a telephone number which matches the present regional number, then the regional number removal means removes the regional number from the selected telephone number. After the regional number removal means finishes processing the selected telephone number, the caller means calls the resultant telephone number.

It should be noted that some countries require addition of an external region call number when a telephone number is placed to a region other than the region from which the telephone call is being placed. For example, in the United States "1" must be added to the front of an outside area code.

Therefore, another aspect of the invention further includes an external region call number addition means. When the regional number of the selected telephone number does not match the present regional number, then the external region call number addition means adds an external region call number, which indicates that the telephone number under consideration is for a telephone not in the same region as the telephone, to the selected telephone number. Then the caller means calls the telephone number resulting from processes performed by the regional number removal means or by the external region call number addition means so that a telephone call can be correctly placed.

Another aspect of the present invention further includes a telephone number extraction means and a caller's telephone number registration means. The telephone number extraction means extracts a caller's telephone number transmitted with a ringing signal over a telephone line. The caller's telephone number registration means then registers the extracted telephone number. In this way, the caller's telephone number can be automatically registered so that a user can efficiently call the telephone number.

According to a still further aspect of the present invention, a telephone includes a telephone number memory for storing telephone numbers; a present regional number memory for storing a present regional number of the telephone itself; input means for performing input processes to store a telephone number in the telephone number memory means; regional number removal means for removing a regional number portion from the telephone number inputted via the input means when the regional number portion matches the present regional number; and telephone number registration means for registering, in the telephone number memory, the telephone number after the telephone number is processed by the regional number removal means.

According to this aspect of the invention, the telephone number memory stores telephone numbers and the present regional number memory stores a regional number for the regional number for the telephone itself. The input means performs input processes for storing telephone numbers in the telephone number memory. When the telephone number inputted by the input means includes a telephone number which matches the present regional number, then the regional number removal means removes the regional number from the selected telephone number. Then the telephone number registration means stores, in the telephone number memory, the telephone number resulting from processes of the regional number removal means. The telephone number selection means selects, from the telephone number stored in the telephone number memory, a telephone number corresponding to an indication from a user. Then the caller means calls the selected telephone number.

In this aspect of the invention, the regional number portion of a telephone number is removed before the telephone number is registered. Therefore potential problems, such as the call not being placed or higher than normal telephone charges being required, caused by not removing the regional number can be prevented. Also, there is no need to remove the regional number from a telephone number each time a call is placed using the telephone number. Also, because the unnecessary regional number portion has been removed before storing the telephone number, less memory capacity is required.

The telephone can be designed so that, when the telephone is taken to another region so that the present regional number stored in the present regional number memory must be changed, the regional number of the previous region is automatically added to all telephone numbers without a regional number and the regional number of the new region is removed from those telephone number with the regional number of the new region.

The input means can be for extracting and inputting a telephone number transmitted with a ringing signal over a telephone line. In this way, the telephone number received from a remote telephone will automatically be stored after having its regional number removed. Therefore, telephone calls can be efficiently placed without problems.

It should be noted that although area code numbers required for intercity and inter-area calls and international country numbers required for international calls were given as examples of regional numbers, only an area code number, or an intercity number, need be used as the regional number when no international telephone calls are expected to be made using a particular telephone number. Contrarily, when it is assumed that a telephone number will be used to place international calls, then both the international country number and the area code number can be used as the regional number. In areas where telephone calls can be placed without problem within a certain area when the area code for that area is dialed before the telephone number, then only the international country code need be used as the regional number.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
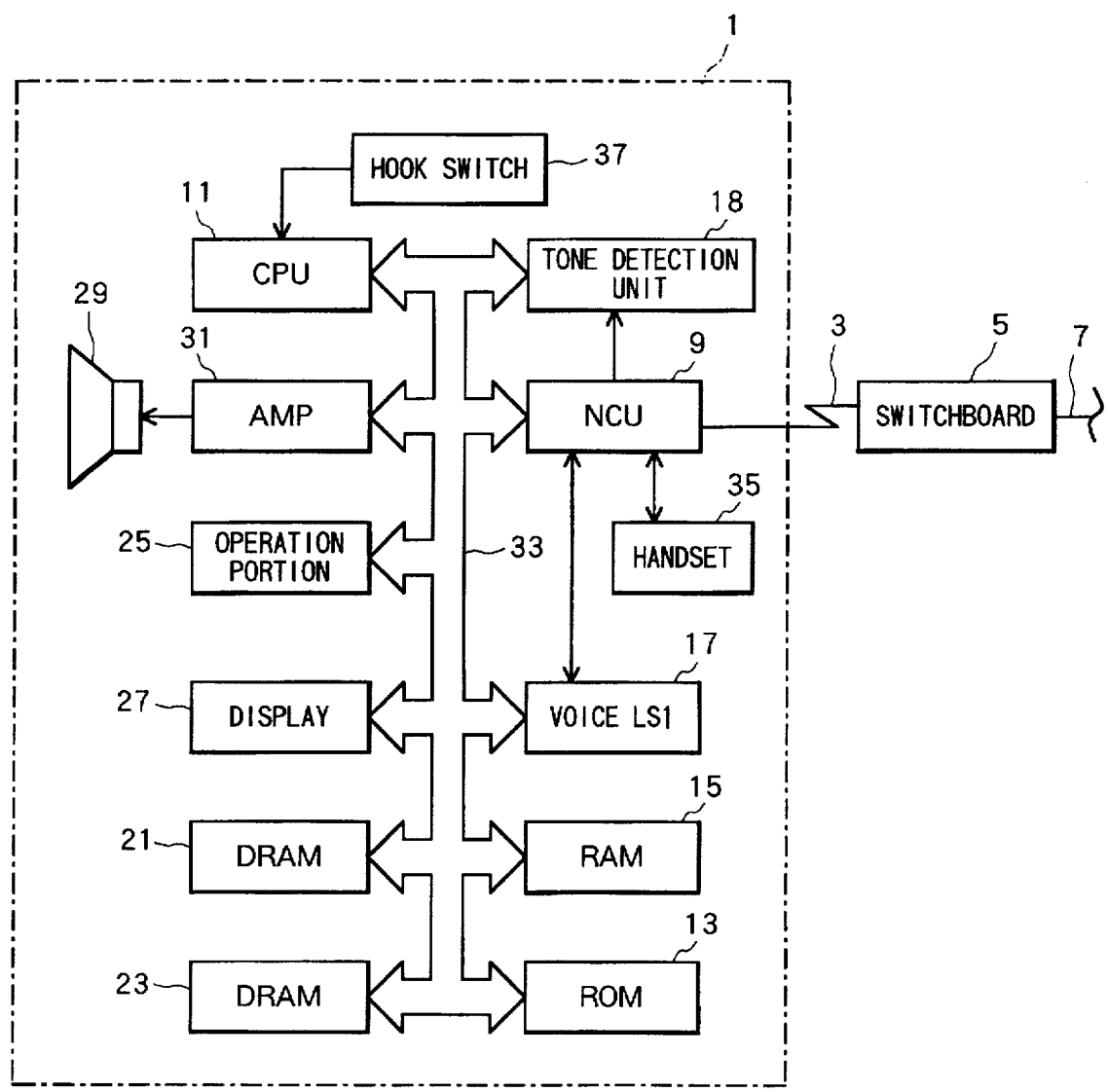
FIG. 1 is a block diagram showing essential components of a telephone according to a first embodiment of the invention.

A telephone according to preferred embodiments of the present invention will be described while referring to the accompanying drawings wherein like parts and components are designated by the same reference numerals to avoid duplicating description.

Configuration of a telephone 1 having an answering machine function will be described while referring to FIG. 1. The telephone 1 is connected to a switchboard 5 via a telephone line 3. A telephone line 7 is connected to the switchboard 5. Although not shown in the drawings, other remote telephones are connected to the switchboard 5 by the telephone line 7 or by further telephone lines and switchboards also not shown in the drawings.

When a party at a remote telephone dials the telephone number of the telephone 1, the switchboard 5 transmits an intermittent ringing signal to the telephone 1. The telephone 1 will be referred to alternatively as the recipient hereinafter. The remote telephone will be alternatively referred to as the caller hereinafter. When the recipient is registered at the switchboard 5 as a subscriber of a caller's telephone number reception service for providing caller-ID numbers of incoming telephone calls, then the switchboard 5 transmits the caller's telephone number during the silent interval between the first and second ringing signals. Such a switching system is presently in practical use in the United States. It will be assumed for this example that the user of the telephone 1 is a subscriber of the caller's telephone number reception service.

The telephone 1 includes a network control unit (NCU) 9 for controlling connection and disengagement of telephone lines, a CPU 11, a ROM 13, and a RAM 15. The NCU 9 is connected to the telephone line 3 and receives ringing signals, caller's telephone numbers, and, when the caller hangs up, busy signals (repetition signals) transmitted from the switchboard 5. The NCU 9 also transmits dial signals (selection signals) according to dialing operations by the user for placing a call. The NCU 9 also transmits and receives analog voice signals during a telephone call. The CPU 11 performs various control processes to be described later. The ROM 13 stores control programs executed by the CPU 11. The RAM 15 is for temporarily storing results of calculations performed by the CPU 11.

Further, the telephone 1 includes a voice LSI 17, a tone detection unit 18, dynamic RAMs (DRAM) 21 and 23, an operation portion 25, a display 27, and an amp 31 connected to a speaker 29, all connected by a bus 33. The voice LSI 17 converts analog voice signals received by the NCU 9 into digital voice signals and also converts digital voice signals generated within the telephone 1 into analog voice signals and outputs the analog voice signals to the NCU 9. The tone detection unit 18 detects a caller's telephone number transmitted in an FSK signal during silent intervals between the first ringing signal and a subsequent ringing signal. The DRAM 21 serves as a memory medium for storing, when the telephone 1 is set to its answering machine mode, an answer message, that is, an outgoing message (OGM) to be transmitted to the caller; messages from the caller, that is, incoming messages; and callers' telephone numbers. The DRAM 23 is for storing telephone numbers that can be automatically dialed using one-touch dialing, abbreviated dialing, and other similar dialing functions. The operation portion 25 includes various keys such as dial keys made from a plurality of numbers for dialing operations; a mode switching key for switching the operation mode of the telephone 1 between the answering machine mode for activating an answering machine function and an at-home function wherein the answering machine function is not activated; a telephone book key for registering telephone numbers to be automatically dialed; a redial key for causing a telephone number just previously dialed to be redialed; a play key for commanding reproduction of incoming messages stored in the DRAM 21; and a regional number registration key for a registering regional number of the telephone 1. The display 27 is for outputting telephone numbers, various messages, and the like. The amp 31 is for outputting ringing tones and reproduced incoming messages over the speaker 29. Additionally, a handset 35 is connected to the NCU 9 and a hook switch 37, which turns off when the handset 35 is off the housing of the telephone 1.

Next, a brief description of normal transmission and reception operations of the telephone 1 will be provided. First, when a telephone call, or transmission, is to be made, the NCU 9 detects whether the hook switch 37 is off to determine whether the handset 35 is off the hook. Afterward, a selecting signal corresponding to dial operations performed by the user using the dial keys of the operation portion 25 is outputted to the NCU 9. As a result, the selection signal is transmitted from the NCU 9 to the switchboard 5 via the telephone line 3 to ring a remote party. On the other hand, upon arrival of an incoming transmission, the CPU 11 detects, via the NCU 9, whether a ringing signal has been received. In association with reception of the ringing signal, the CPU 11 outputs a predetermined ringing tone via the amp 31 and the speaker 29. When the CPU 11 detects that the handset 35 is taken off the hook during detection of the ringing signal, it connects the NCU 9 with the telephone line 3 so that a telephone conversation using the handset 35 is possible.

Next, an explanation of processes executed by the CPU 11 when, using the mode switching key, the operation mode of the telephone 1 is set to the answering mode will be provided while referring to the flowcharts in FIGS. 2 through 7.

Figure 2:
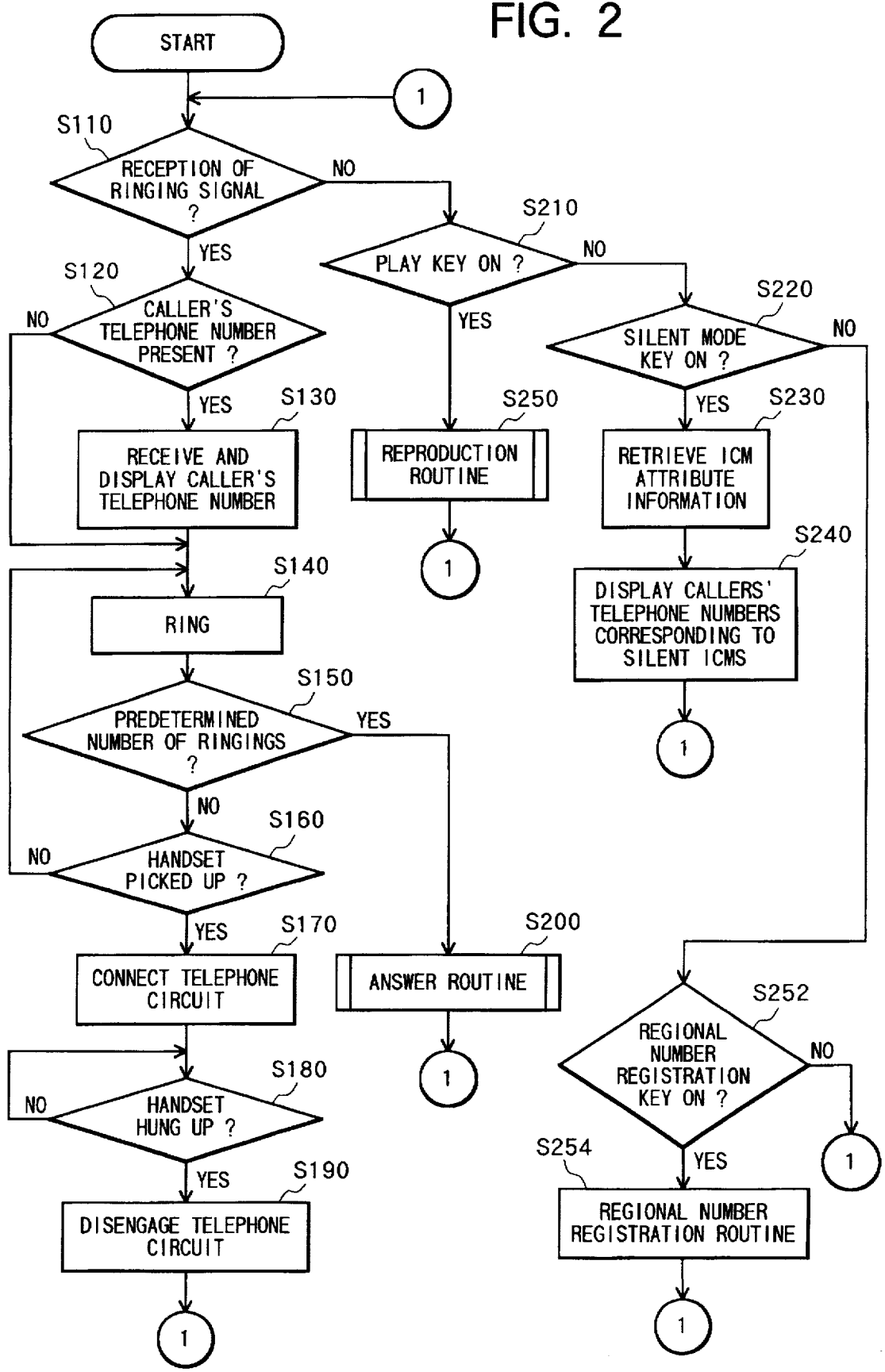
FIG. 2 is a flowchart representing overall processes performed during an answering machine mode of the telephone of FIG. 1.

FIG. 2 is a flowchart representing a program of overall processes performed during the answering machine mode. When this program is started, whether or not a ringing signal has been received is determined in step 110. Hereinafter, individual steps will be referred to as Si, wherein i is an individual step. If a ringing signal has been received (S110:YES), then, using the tone detection unit 18, whether or not a caller telephone number was transmitted with the ringing signal is determined in S120. If a caller's telephone number was transmitted with the ringing signal (S120:YES), then the caller's telephone number is stored temporarily in the RAM 15 and displayed on the display 27.

After processes of S130 are completed, or if in S120 it was determined that no caller's telephone number was transmitted (S120:NO), then the program proceeds to S140 where a ringing tone is outputted from the speaker 29 in association with the ringing signal presently being received. Then whether or not a predetermined number of ringing tones (for example, five) has been rung is determined in S150. When it is determined that the predetermined number of ringing tones has not been rung (S150:NO), then whether or not the user has taken the handset 35 off the hook is determined in S160. If not (S160:NO), then the routine returns to S140, whereupon S140 through S160 are repeated.

When in S160 it is determined that the handset 35 has been taken off the hook (S160:YES), then the telephone line 3 is connected to the NCU 9 in S170. That is, if the user picks up the handset 35 before the predetermined number of ringings has been rung, then the telephone line 3 is connected so that a telephone conversation can be held using the handset 35.

Next, it is determined in S180 whether or not the user has replaced the handset 35 on the hook so that the hook switch 37 is turned off. This step is repeated until it is determined that the hook switch 37 is turned off. When it is determined that the hook switch 37 is turned off (S180:YES), then the telephone line 3 is disengaged in S190. Afterward, the routine returns to S110 and waits for reception of another ringing signal.

On the other hand, if in S150 it is determined that the predetermined number of ringings has been rung, that is, when the user does not take the handset 35 off the hook before five ringings have been rung (S150:YES), then an answer routine for automatically transmitting an answer to the caller is performed in S200. Afterward, the routine returns to S110.

Figure 3:
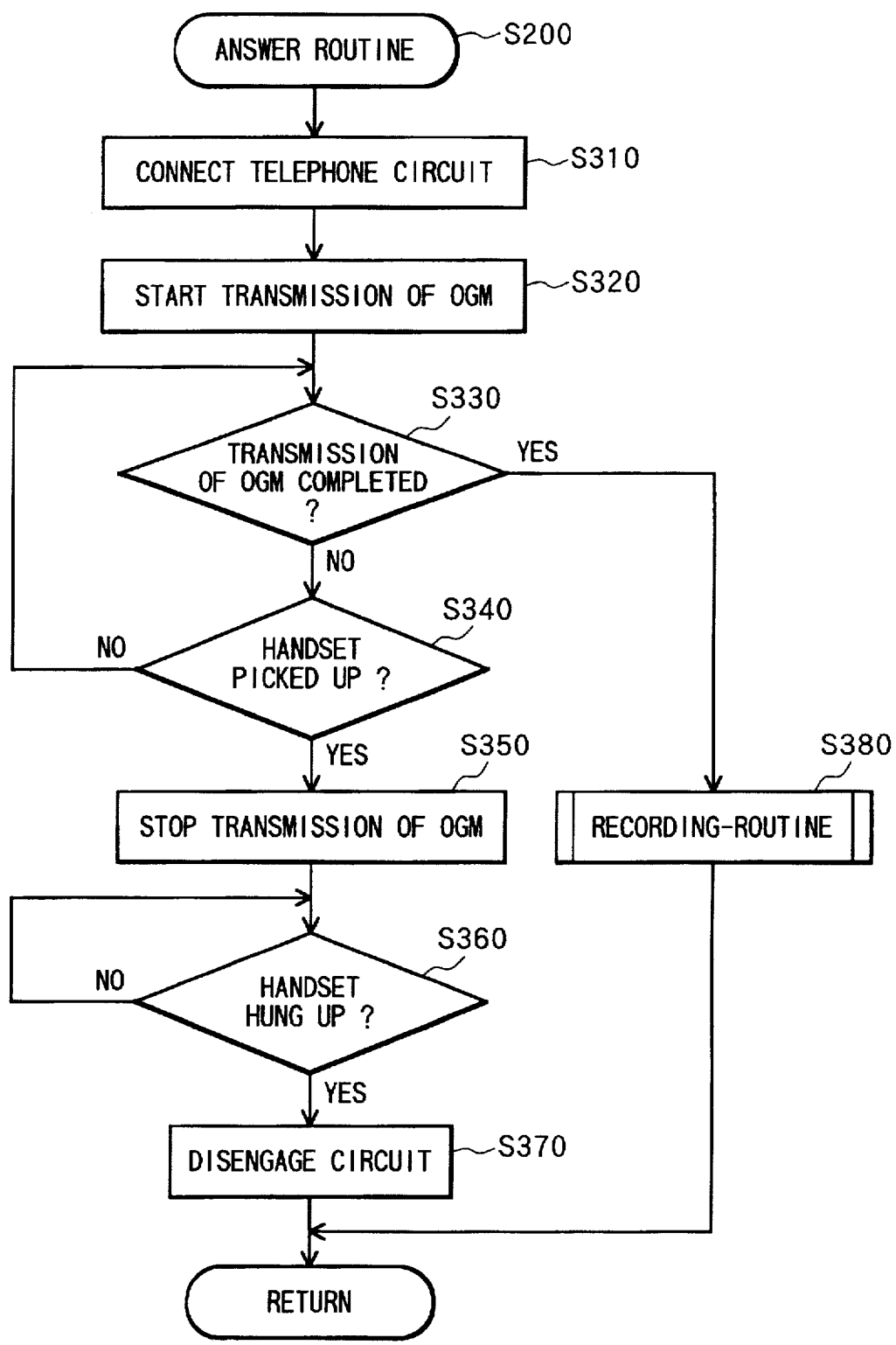
FIG. 3 is a flowchart representing an answer routine of the processes shown in FIG. 2.

The answer routine performed in S200 is represented by the flowchart of FIG. 3. When the answer routine is started, the telephone line 3 is connected in S310. Then an outgoing message prestored in the DRAM 21 is transmitted to the telephone line 3 via the voice LSI 17 and the NCU 9.

Next, whether or not transmission of the outgoing message has been completed is determined in S330. If transmission has not been completed (S330:NO), then whether or not the handset 35 is off the hook is determined in S340. If not (S340:NO), then the routine returns to S330, whereupon the processes of S330 and S340 are repeated. When it is determined in S340 that the user has picked up the handset 35 (S340:YES), then the routine proceeds to S350, where the outgoing message is stopped and a telephone conversation using the handset 35 is made possible. Next, it is determined in S360 whether or not the handset 35 has been replaced on the hook. If so (S360:YES), then the telephone line 3 is disengaged and the answer routine is ended. That is, when a user picks up the handset 35 during transmission of the outgoing message, then the user can have a telephone conversation using the handset 35.

On the other hand, when it is determined in S330 that transmission of the outgoing message has been completed (S330:YES), the a recording routine for allowing the caller to record an incoming message is performed in S380. The answer routine is ended after the recording routine is completed.

Figure 4:
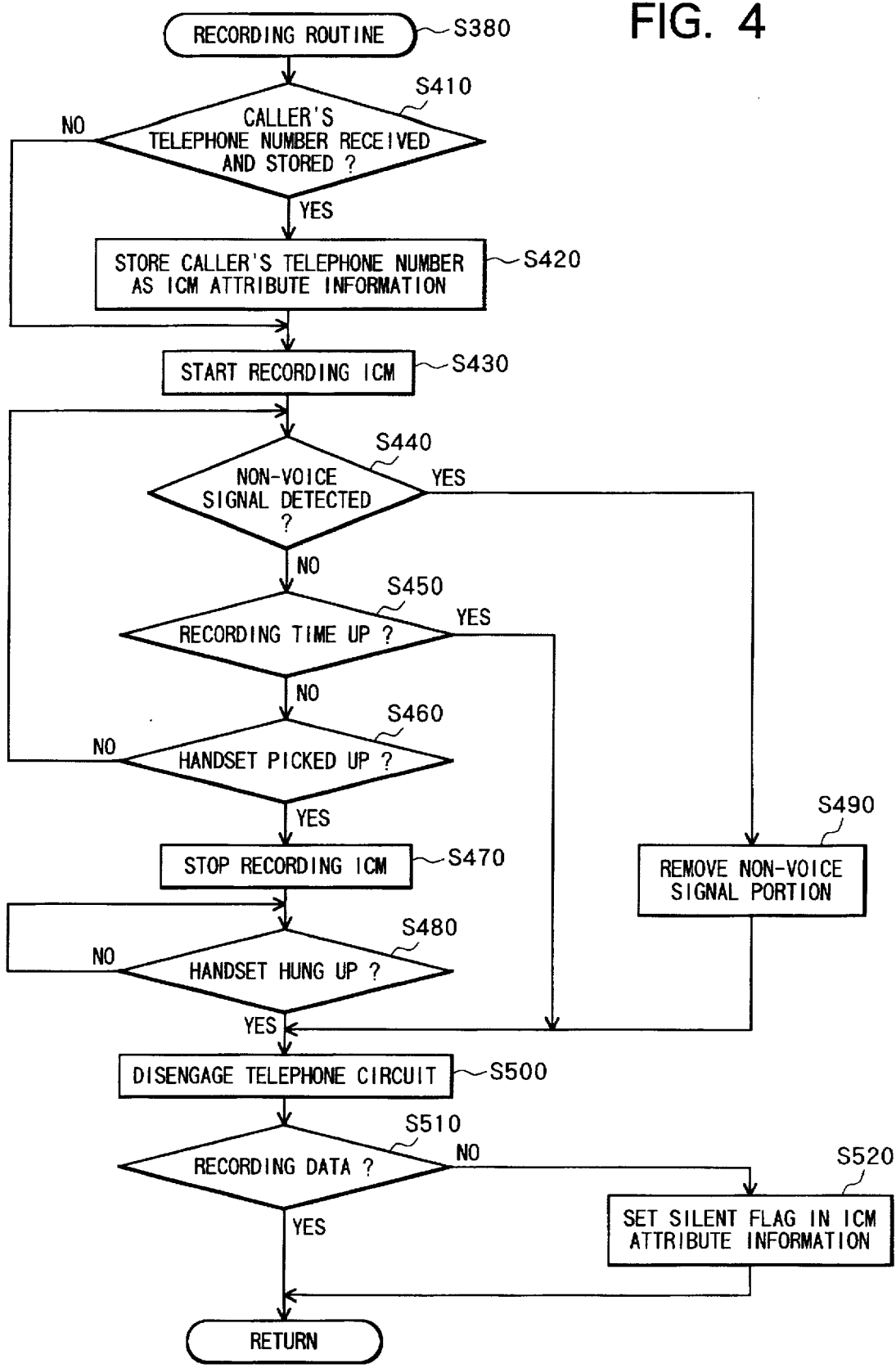
FIG. 4 is a flowchart representing a recording routine of the answer routine of FIG. 3.

FIG. 4 is a flowchart representing processes performed during the recording routine. When the recording routine starts, then in S410 whether or not a caller's telephone number was received and stored in the RAM 15 during S130 is determined. If the caller's telephone number has been received and stored (S410:YES), then processes are performed in S420 for storing the caller's telephone number in the DRAM 21 as ICM attribute information in a one-to-one correspondence with an incoming message to be recorded.

When the processes of S420 are completed, or when it is determined in S410 that a caller's telephone number has not been received (S410:NO), then the routine proceeds to S430, where the incoming message received over the telephone line 3 is recorded. It should be noted that the analog voice signal from the caller is converted into a digital voice signal via the NCU 9 and the voice LSI 17 and is stored as recording data in the DRAM 21.

Then it is determined in S440 whether or not an interval with no voice continues for a predetermined time or longer during recording of the incoming message. Said differently, whether or not a non-voice signal continues for the predetermined time or longer is determined in S440. Examples of non-voice signals include silent signals with no sound whatsoever, continuous monotonal signals such as a dial tone, and repeating monotonal signals such as a busy signal. A positive determination is made in S440 if a non-voice signal is received continuously for the predetermined time or longer.

When it is determined in S440 that a non-voice signal is not received continuously for the predetermined time or longer (S440:NO), then whether or not a preset recording time has elapsed is determined in S450. If the recording time has not elapsed (S450:NO), then whether or not the handset 35 is off the hook is determined in S460. If the handset 35 is off the hook (S460:NO), then the routine returns to S440, whereupon S440 through S460 are repeated. If it is determined in S460 that the handset 35 is off the hook (S460:YES), then recording of the incoming message is stopped and a telephone conversation using the handset 35 made possible in S470. That is, when a user picks up the handset 35 during recording of an incoming message, recording processes are stopped and a telephone conversation using the handset 35 made possible. Then in S480 the routine waits until the handset 35 is hung up.

On the other hand, when it is determined in S440 that a non-voice signal continues for the predetermined time or longer (S440:YES), then the routine proceeds to S490 where non-voice signal portion of the recording data is erased from the DRAM 21. It should be noted that a silent message will result when a non-voice signal continues for the predetermined time or longer from the start of the incoming message. That is, although all recording data of the incoming message itself will be removed from the DRAM 21, that recording of an incoming message was performed will remain.

The telephone line 3 is disengaged in S500 under any of three circumstances: after completion of the processes in S490, when it is determined in S450 that the recording time has elapsed (S450:YES), or when it is determined in S480 that the handset 35 has been hung up (S480:YES). Then whether or not voice data from the incoming message recorded this time is stored in the DRAM 21 is determined in S510. If so (S510:YES), then the recording routine is ended. If recording data is not stored in the DRAM 21 for the incoming message recorded this time (S510:NO), then in S520 a silent flag is set in the ICM attribute information for the incoming message. Then the recording routine is ended. The silent flag indicates that, although the incoming message was recorded at one point, all corresponding recording data was erased from the DRAM 21 because a non-voice signal continued from the start of the incoming message for the predetermined time or more.

On the other hand, when it is determined in S110 of FIG. 2 that no ringing signal was received (S110:NO), then whether or not the play key of the operation portion 25 is turned on is determined in S210. If the play key is not turned on (S210:NO), then whether or not a silent mode key has been pressed is determined in S220. If not (S220:NO), then whether or not the regional number registration key has been pressed is determined in S252. If not (S252:NO), then the routine returns to S110.

When it is determined in S252 that the regional number registration key has been pressed (S252:YES), then a regional number registration routine is performed in S254. During this routine, a user presses number keys on the telephone 1 to store in the DRAM 23 a present regional number representing the region where the telephone 1 is located. In this example, the regional number is a domestic area code of the United States. The program returns to S110 after completion of the regional number registration routine.

When it is determined in S220 that the silent mode key has been pressed (S220:YES), then ICM attribute information, such as silent flag and the caller's telephone number, for any incoming messages recorded during the recording routine is retrieved in S230 from the DRAM 21. Then in S240, all caller's telephone numbers corresponding to an incoming message to which a silent flag was set during the recording routine, that is, any caller's telephone number corresponding to an incoming message for which no recording data is stored in the DRAM 21, are sorted out and displayed on the display 27. In the present embodiment, one caller's telephone number is displayed each time the silent mode key is pressed, the first caller's telephone number being displayed the first time the silent mode key is pressed, the second caller's telephone number being displayed the second time the silent mode key is pressed, and so on. However, the telephone 1 can be designed so that all caller's telephone number corresponding to incoming messages with no recording data can be displayed cyclically and in order when the silent mode key is pressed once.

When it is determined in S210 that the play key has been depressed (S210:YES), then a reproduction routine is performed in S250 to reproduce incoming messages in the order they were recorded during the recording routine. Also, the caller's telephone number corresponding to the incoming message presently being reproduced is displayed on the display portion 37. Afterward, the program returns to S110.

Figure 5:
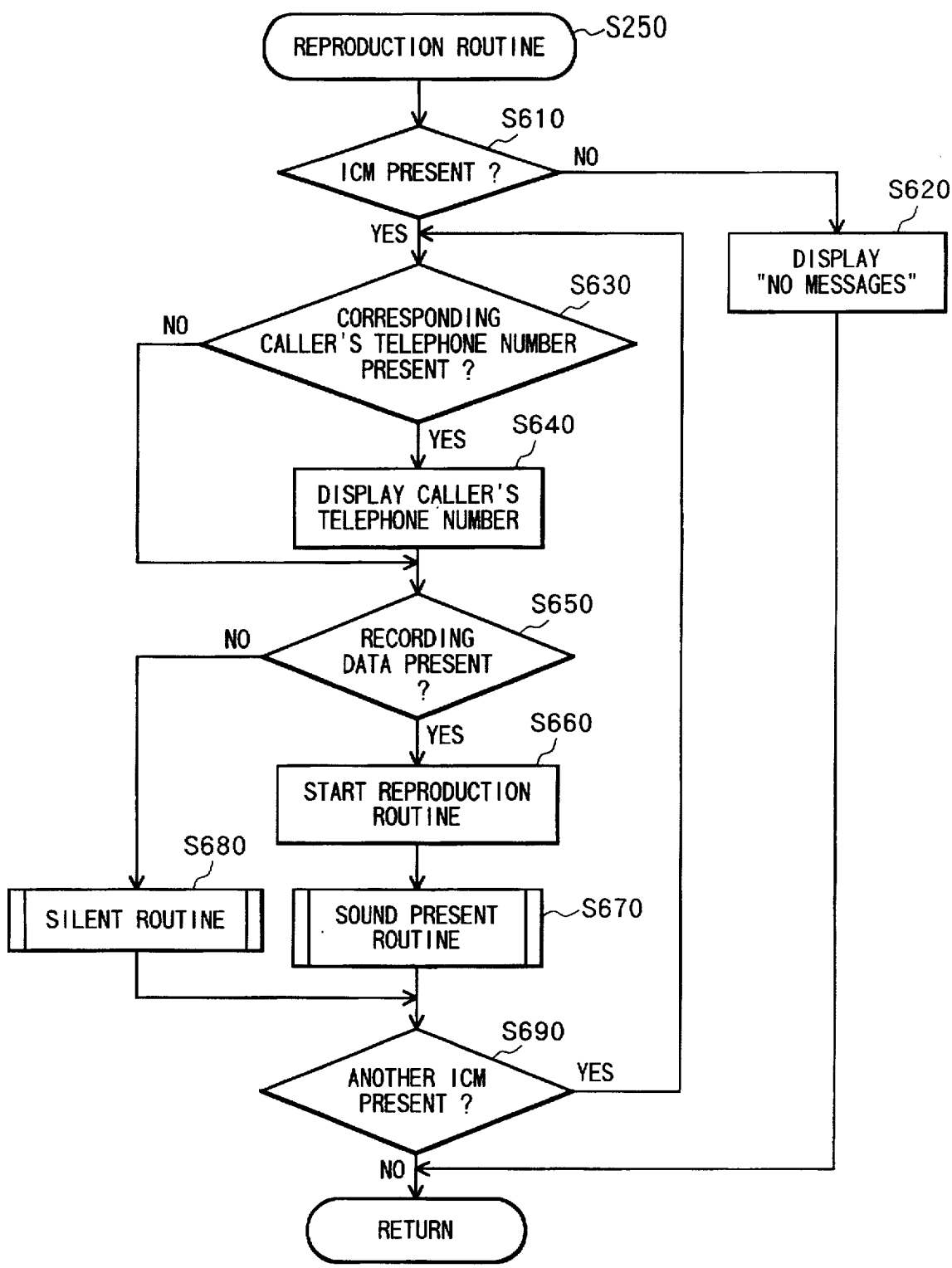
FIG. 5 is a flowchart representing a reproduction routine of the processes shown in FIG. 2.

FIG. 5 shows a flowchart representing the reproduction routine of S250. When the reproduction routine is started, then whether or not an incoming message has been recorded using the recording routine is determined in S610. It should be noted that incoming messages to which a silent flag is set are also treated as incoming messages. When it is determined in S610 that no incoming messages have been recorded (S610:NO), then a message reading that there are no incoming messages is displayed on the display 27 in S620. Then this routine is ended.

On the other hand, when it is determined in S610 that at least one incoming message has been recorded (S610:YES), then whether or not a caller's telephone number corresponding to the incoming message under consideration is stored in the DRAM 21 is determined in S630. When a caller's telephone number is stored in the DRAM 21 (S630:YES), then the caller's telephone number is displayed on the display 27 in S640.

When processes of S640 are completed, or when it is determined in S630 that no caller's telephone number has been stored (S630:NO), then whether or not recording data of the incoming message under consideration is stored in the DRAM 21 is determined in S650 by checking the silent flag corresponding to the incoming message. When it is determined that recording data for the incoming message is present (S650:YES), then processes for reproducing the recording data are started in S660. Then in S670 a sound present routine represented by the flowchart in FIG. 6 is performed.

Figure 6:
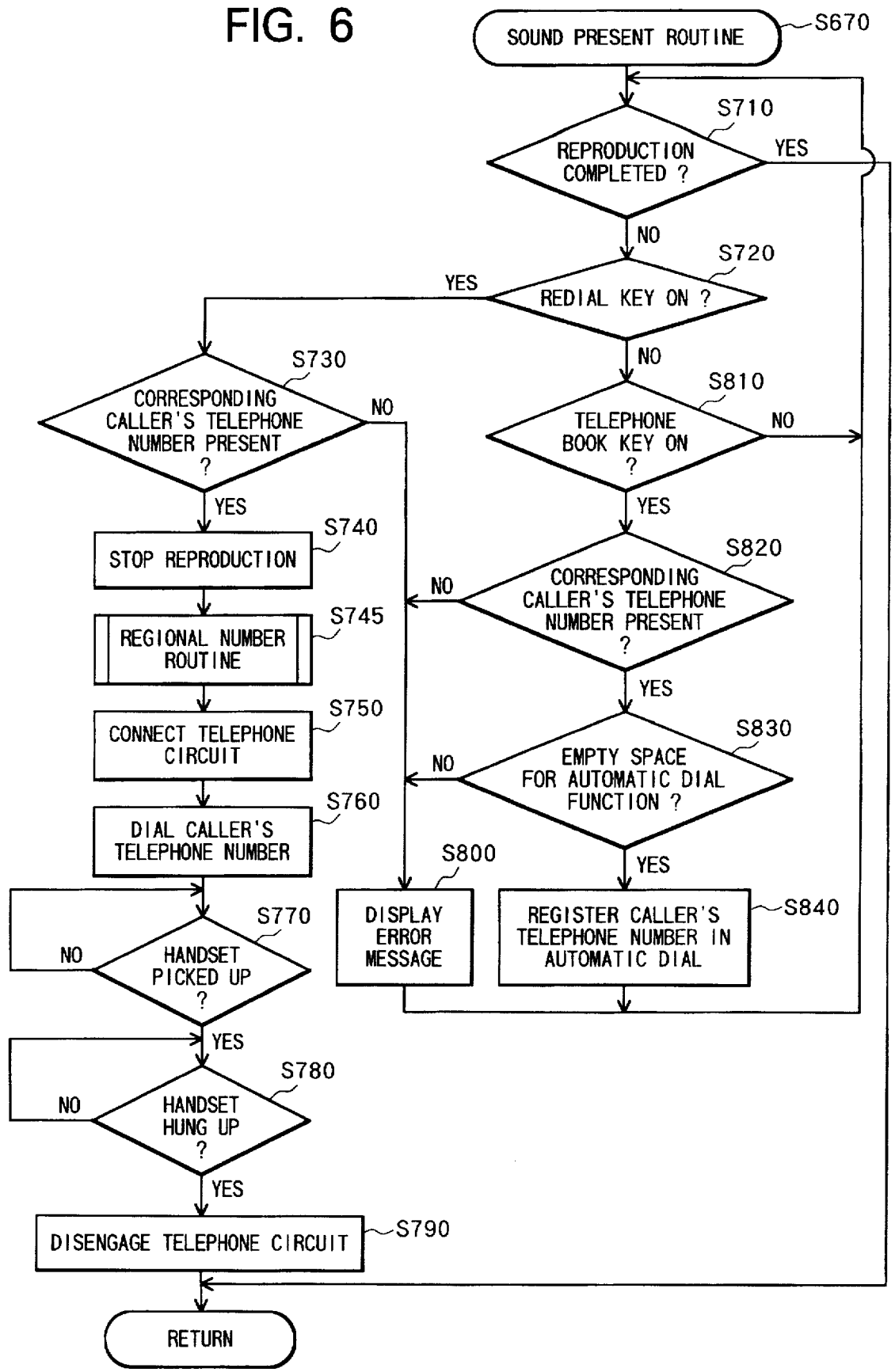
FIG. 6 is a flowchart representing a sound present routine performed during the reproduction routine of FIG. 5.

After the sound present routine of FIG. 6 is started in S670, then whether or not reproduction of recording data of the incoming message has been completed is determined in S710. If reproduction of the incoming message has been completed (S710:YES), then this routine is ended. On the other hand if reproduction of the incoming message has not been completed (S710:NO), then whether or not a redial key of the operation portion 25 has been pressed is determined in S720. If the redial key has been pressed (S720:YES), then whether or not the caller's telephone number for the incoming message presently being reproduced is stored in the DRAM 21 is determined in S730. If the caller's telephone number is stored in the DRAM 21 (S730:YES), then the reproduction of the incoming message is stopped in S740.

Figure 8:
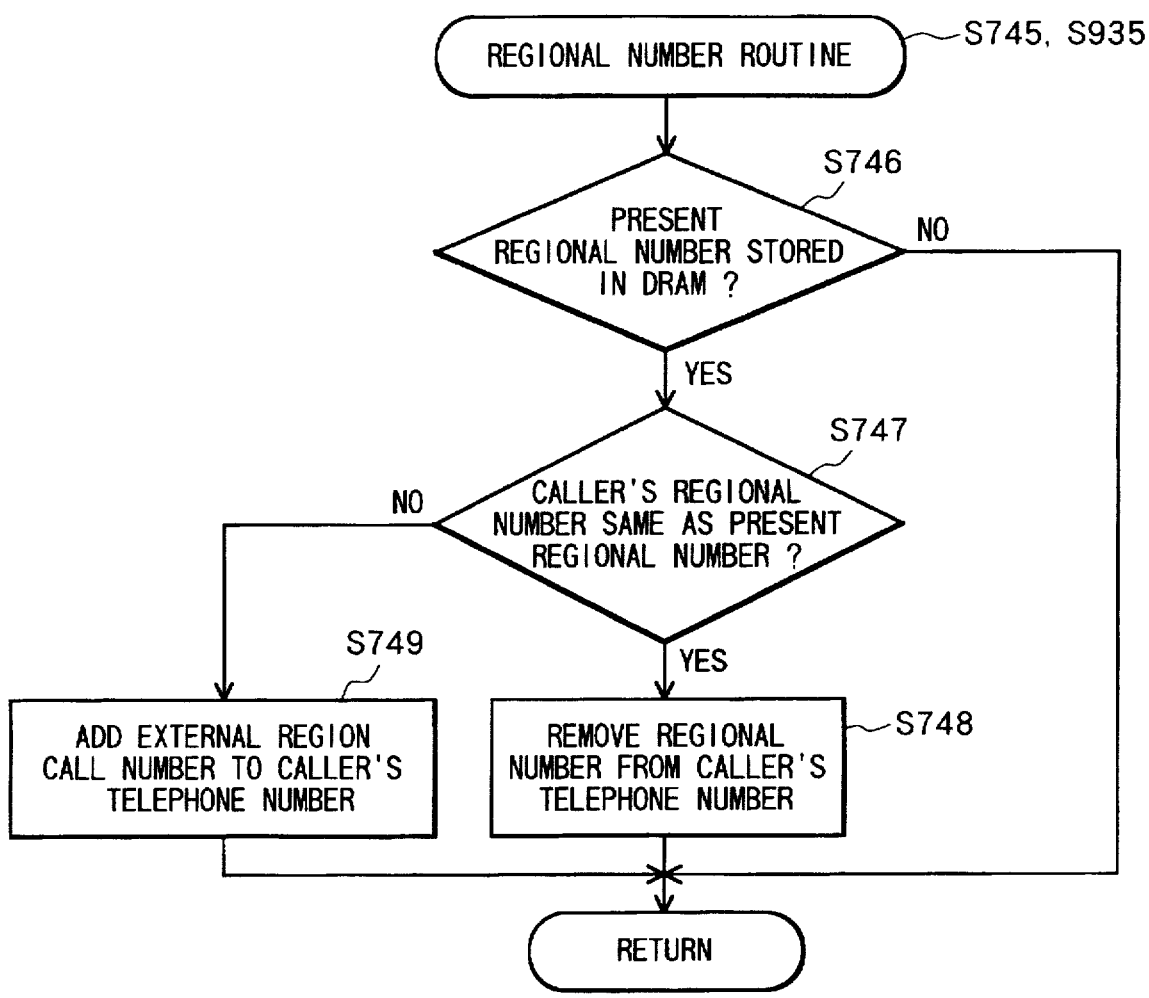
FIG. 8 is a flowchart representing a regional number routine performed during the sound present routine of FIG. 6 and the silent routine of FIG. 7.

Next, a regional number routine is performed in S745. FIG. 8 shows a flowchart representing the regional number routine. In S746, whether or not the present regional number, that is, the regional number representing the region where the telephone 1 itself is located, is stored in the DRAM 23 is determined. If the present regional number is not stored in the DRAM 23 (S746:NO), then the routine returns to the sound present routine (i.e., to S750) without performing any further processes. If the present regional number is stored in the DRAM 23 (S746:YES), then whether or not the regional number portion of the caller's telephone number from S730 matches the present regional number registered in the DRAM 23 is determined in S747. If the regional numbers do not match (S747:NO), then in S749 an external region call number is added to the front of the caller's telephone number and that a regional number exists for telephoning outside the present region is indicated. Examples of external region call numbers include "1" required for calling between different area codes in the United States, international numbers required for placing calls to foreign countries, for example, "001" or "0041" for dialing from Japan and "011" for dialing from the United States, and country codes such as "1" for dialing to the United States, "81" for dialing to Japan, and "44" for dialing to Great Britain from a foreign country. Then the routine proceeds to S750. If the regional numbers match (S747:YES), then the registered regional number is removed from the caller's telephone number in S748.

Next, the telephone line 3 is connected in S750 and the caller's telephone number is dialed in S760. It should be noted that when S746 results in a positive determination, then the telephone number resulting from processes of S748 or S749 will be used to dial the caller in S760 to be described below. On the other hand, a negative determination in S746 will result in the telephone number of S730 being used as is for telephoning the caller in S760. The routine waits in S770 until the user picks up the handset 35 so that the hook switch 37 is turned off. That is, the processes performed in S750 through S770 are performed with the handset 35 on the hook, that is, in a monitor condition.

When it is determined in S770 that the handset 35 is taken off the hook (S770:YES), then a telephone conversation using the handset 35 is made possible and the program waits in S780 until the telephone conversation is completed. When it is detected in S780 that the hook switch 37 is turned on (S780:YES), then the telephone line 3 is disengaged in S790 and this routine is ended.

When it is determined in S730 that no caller's telephone number exists corresponding to the incoming message presently being reproduced (S730:NO), then an error message is displayed on the display 27 in S800. In this case the error message would be one informing the user that dialing can not be automatically performed using the redial key. Then the routine returns to S710.

On the other hand, when it is determined in S720 that the redial key has not been pressed (S720:NO), then whether or not the telephone book key of the operation portion 25 has been turned on is determined in S810. When it is determined in S810 that the telephone book key is not turned on (S810:NO), then the routine returns to S710. However, when the telephone book key is determined to be turned on (S810:YES), then, in the same manner as described for S730, whether or not the caller's telephone number for the incoming message presently being reproduced is stored in the DRAM 21 is determined in S820. When it is determined that the caller's telephone number is stored (S820:YES), then whether or not empty space exists in the registration frame for the automatic dial (abbreviated dialing) function is determined in S830. When empty space exists for the automatic dialing function (S830:YES), then the caller's telephone number corresponding to the incoming message presently being reproduced is registered in correspondence with the smallest empty abbreviation number as a telephone number capable of being automatically dialed. Afterward, the registered telephone number and its corresponding abbreviated number are displayed on the display 27. Then the routine returns to S710.

When it is determined in S820 that no caller's telephone number is stored (S820:NO), or when it is determined in S830 that no empty space remains for the automatic dial function (S830:NO), then the routine proceeds to S800, where an error message is displayed on the display 27. In this case, the error message would inform the user that the telephone number can not be registered. Afterward, the routine returns to S710.

Explained in summary, when the redial key is pressed during reproduction of an incoming message, then the sound present routine attempts to redial the caller's telephone number corresponding to the incoming message presently being reproduced. This allows the user to easily telephone parties who called while the user was away from the telephone 1. Further, during the regional number routine, the regional number is removed from the caller's telephone number when the caller's telephone number includes a regional number the same as the present regional number of the telephone 1. On the other hand, when the regional number of the caller's telephone number is different from the present regional number, then an external region call number is added to the front of the caller's telephone number.

When the telephone book key is depressed during reproduction of an incoming message, then in S840 the caller's telephone number is registered in correspondence with an empty abbreviated number as an telephone number for abbreviated dialing. Accordingly, telephone calls performed later can be more easily dialed by dialing the automatically registered abbreviated number. It should be noted that when telephone numbers registered in S840 are dialed using processes not shown in the drawings, then the telephone numbers are dialed after the regional number routine of S745 is performed. This is also true when telephone numbers are registered during a S1040 to be described later.

Figure 7:
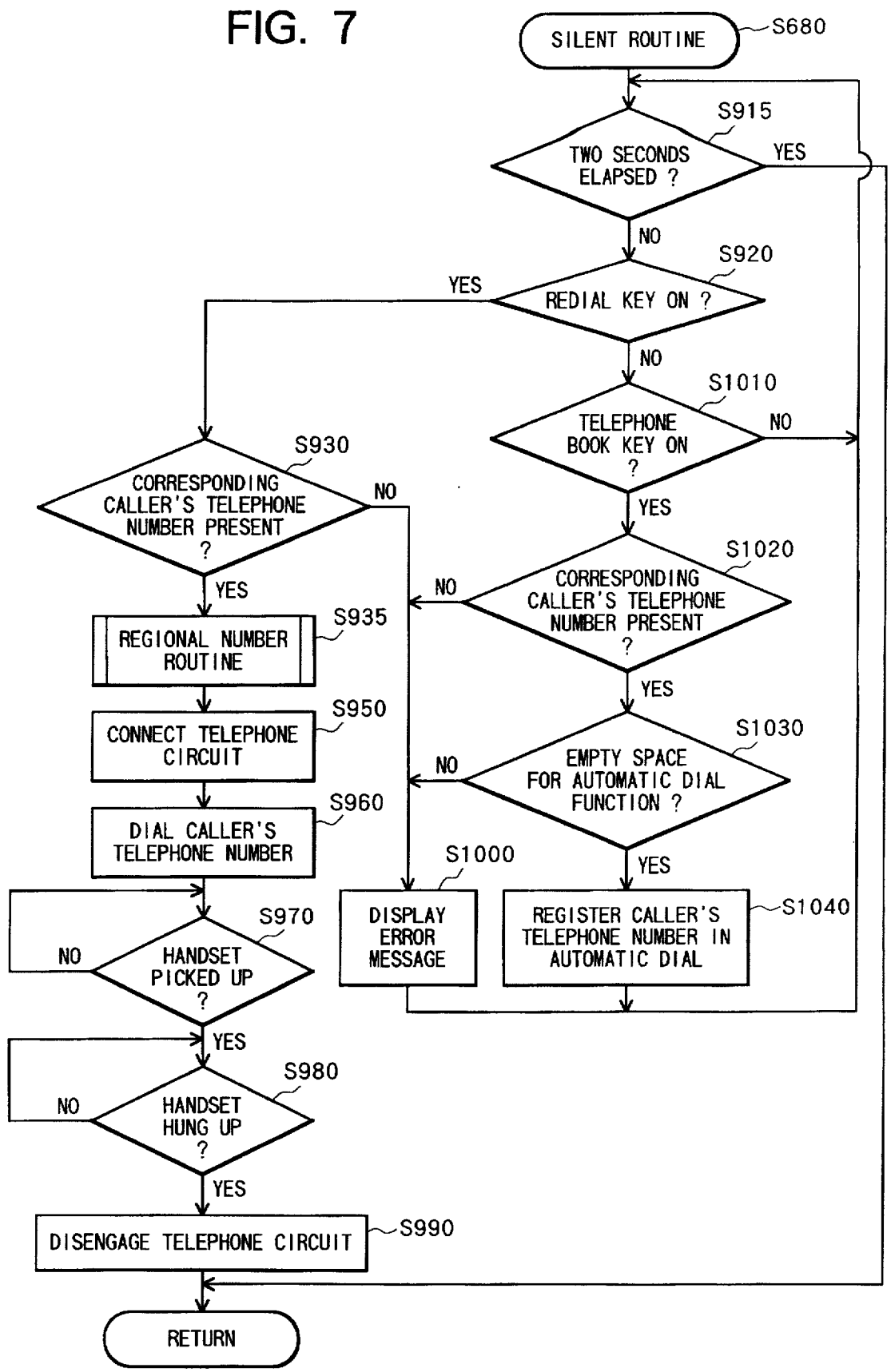
FIG. 7 is a flowchart representing a silent routine performed during the reproduction routine of FIG. 5.

When in S650 of FIG. 5 it is determined that no recording data of the incoming message under consideration this time is stored in the DRAM 21 (S650:NO), then a silent routine is performed in S680 of the flowchart shown in FIG. 7.

It should be noted that the silent routine shown in FIG. 7 is almost identical to the sound present routine shown in FIG. 6. Steps in the silent routine that are similar to steps of the sound present routine are indicated in FIG. 7 with the same step number plus 200. However, two main differences exist between the silent routine and the sound present routine. Since incoming messages are not reproduced during the silent routine, whether or not a two second interval has elapsed is determined in S915 instead of determining whether or not reproduction of an incoming message has been completed as in S710 of FIG. 7. Also, when it is determined in S930 that a caller's telephone number is stored in the DRAM 21 in correspondence with the incoming message under consideration, which in this case is actually a silent message for which no recording data is stored in the DRAM 21 (S930:YES), then the routine proceeds directly to S935 of the regional number routine. It should be noted that the regional number routine of S935 is the same as the regional number routine of S745 and is represented by the flowchart in FIG. 8.

Accordingly, when the redial key is depressed during the silent routine also (S920:YES), then the regional number is removed from the caller's telephone number in S935 if the caller's telephone number corresponding to the incoming message under consideration includes the present regional number. Alternatively, if the caller's telephone number includes at its front a regional number different from the registered regional number, then the external region call number is added to the front of the caller's telephone number in S935. Next, the caller's telephone number processed in the regional number routine is dialed in S950 and S960.

When the telephone book key is depressed (S1010:YES), then in S1040 the caller's telephone number corresponding to the incoming message is registered in correspondence with an empty abbreviated number as a telephone number for automatic dialing.

When the sound present routine of S670 is completed, or when the silent routine of S680 is completed, then as shown in FIG. 5 the routine proceeds to S690, where whether or not a succeeding incoming message is stored in the DRAM 21 is determined. When there is another incoming message (S690:YES), then the routine returns to S630, whereupon the processes of S630 through S690 are repeated until no further incoming messages remain (S690:NO). Then the reproduction routine is ended.

It should be noted that the program can be designed so that caller's telephone numbers stored in the DRAM 21 are not erased until a predetermined deletion key is manipulated. Alternatively, the caller's telephone numbers can be erased once outputted.

As described above, when the telephone 1 of the present embodiment is set to its answering machine mode, caller's telephone numbers are recorded in S420 in the DRAM 21 in correspondence with callers' incoming messages, which are recorded in order of receipt. When the play key is pressed to reproduce an incoming message, the caller's telephone number corresponding to the incoming message under consideration is displayed in S640 on the display 27. Accordingly, by looking at the displayed telephone numbers, a user can know who called while he or she was away, even when the caller did not leave a message.

When the regional number of a telephone number to be called is the same as the present regional number of the telephone 1, then the regional number is removed in S745 and S935 before a call is made. Therefore, potential problems, such as the call not being placed or higher than normal telephone charges being required, caused by not removing the regional number can be prevented. Because the present regional number is removed from the stored telephone number, the telephone or the registration data for the telephone number can be taken to and used in any region without problem as long as the present regional number is properly corrected using the regional number registration routine of S254.

Also, in the regional number routine of S745 and S945, an external region call number is added to the front of those telephone numbers with regional numbers that differ from the present regional number. Therefore, telephone calls can be made even in countries where an external region call number is required. Of course, in countries where an external region call number is not required, addition of an external region call number can be prevented by setting the telephone 1 so that no external region call number is added or by merely not registering any external region call number in the telephone 1.

Further, although callers' telephone numbers are stored in the DRAM 21, in S440 and in S490 recording data of incoming messages including no voices is erased from the DRAM 21 Accordingly, the DRAM 21 need not have a large memory capacity.

In the telephone 1 according to the present embodiment, callers' telephone numbers corresponding to incoming messages including no voices are stored in S510 and S520 with a silent flag to differentiate them from other incoming messages. When a silent mode key of the operation portion 25 is pressed, the processes of S220 through S240 cause the callers' telephone numbers only to be displayed, in order, on the display 27. Accordingly, the user can quickly know who called by looking at the display of the caller's telephone number even if a caller did not leave a message.

Figure 9:
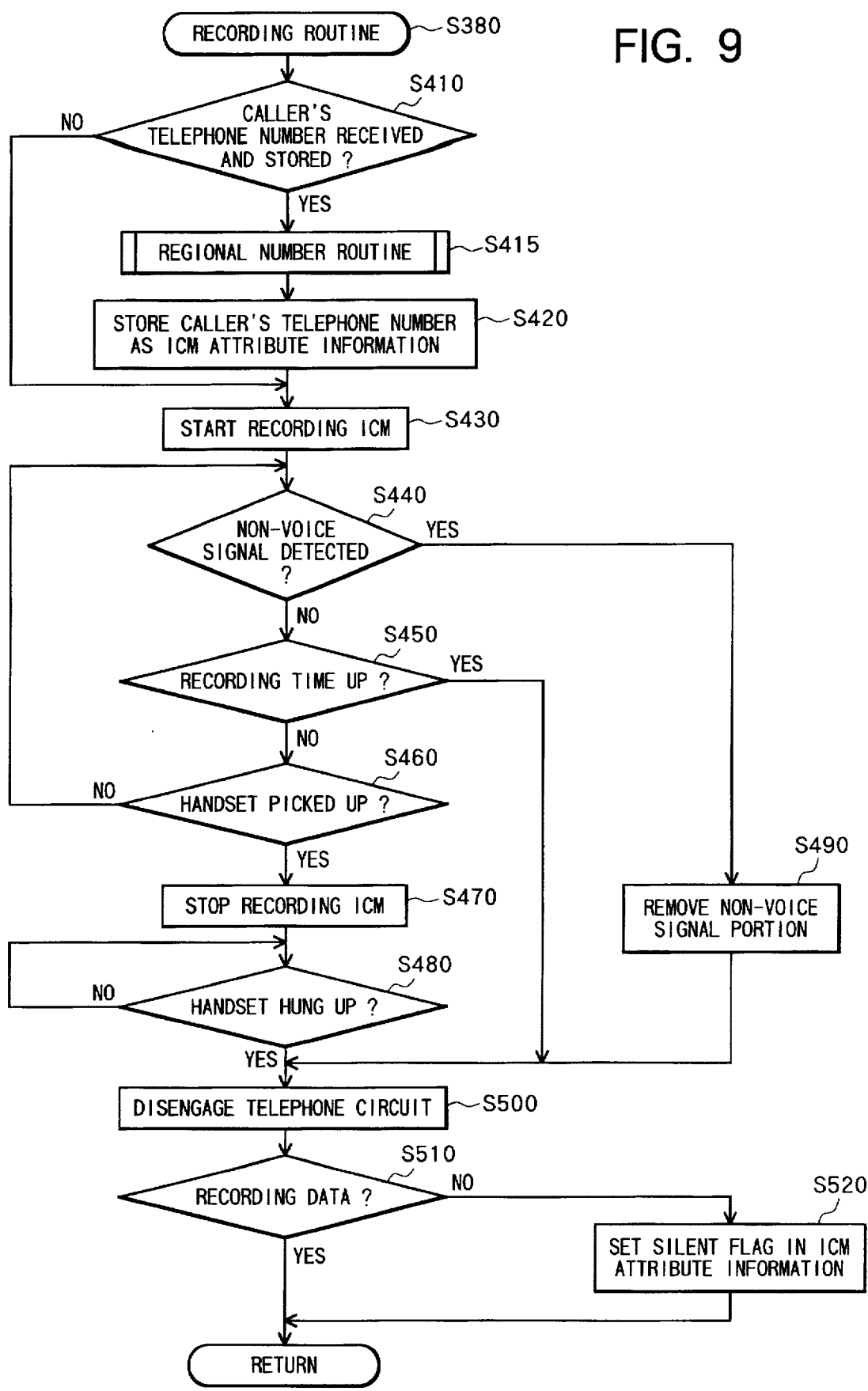
FIG. 9 is a flowchart representing a recording routine according to a second embodiment of the present invention.
Figure 10:
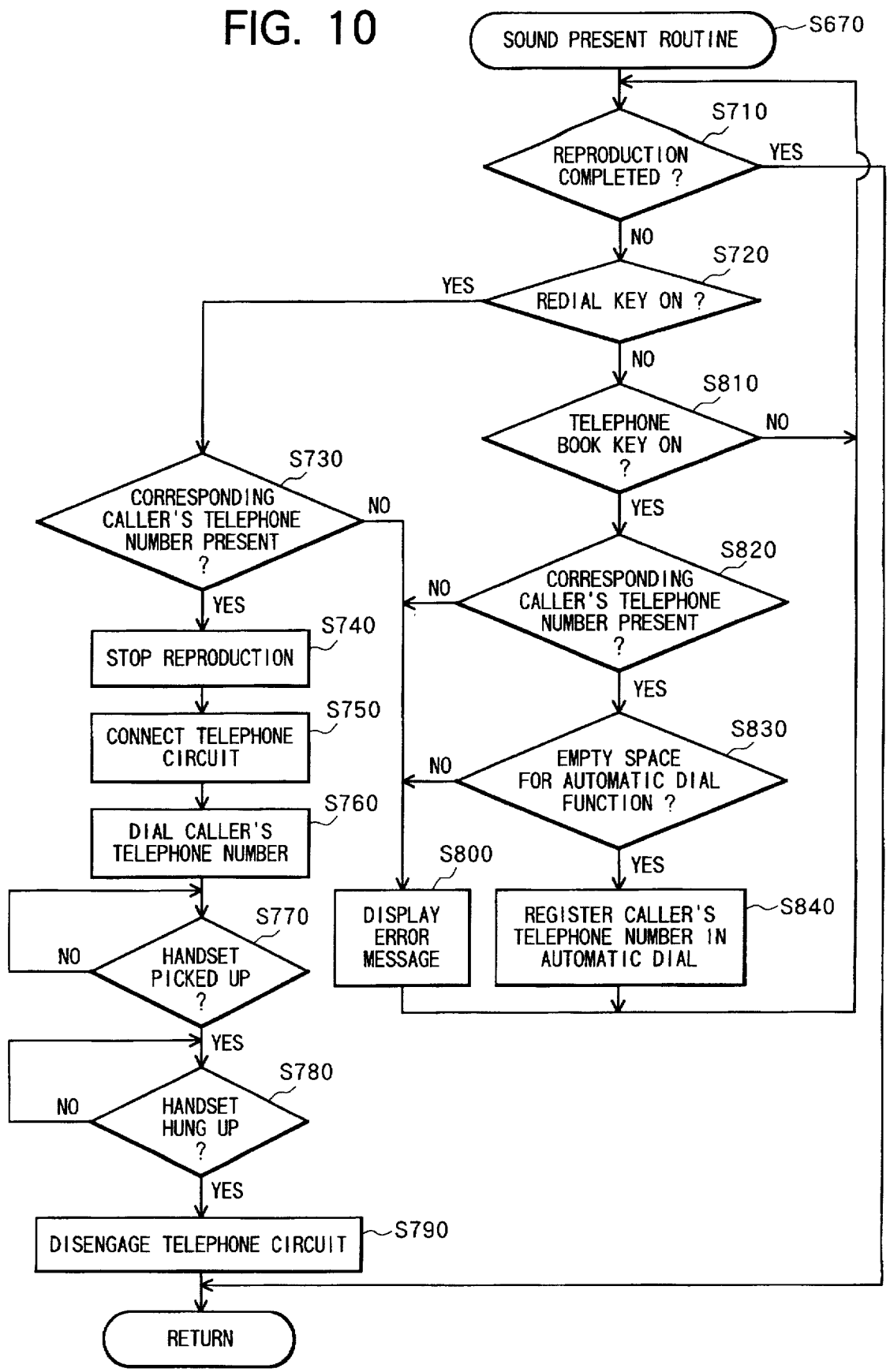
FIG. 10 is a flowchart representing a sound present routine according to the second embodiment of the present invention.
Figure 11:
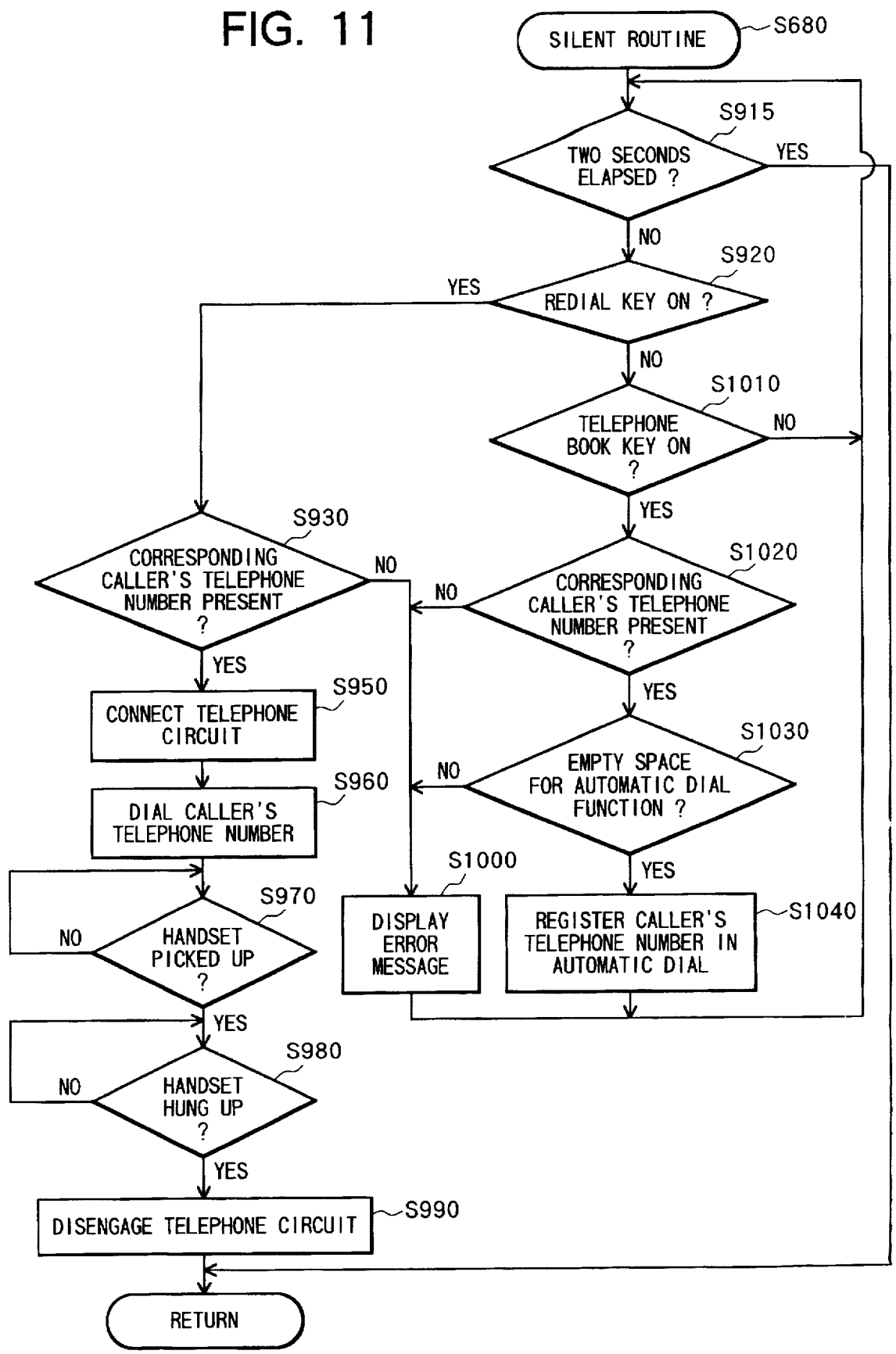
FIG. 11 is a flowchart representing a silent routine according to the second embodiment of the present invention.

The following is an explanation of a second embodiment of the present invention. Flowcharts of FIGS. 9 through 11 represent a recording routine, a sound present routine, and a silent routine, respectively of the second embodiment. The second embodiment differs from the first embodiment in that the regional number routine is performed in a S415 between S410 and S420 of the recording routine shown in FIG. 9. Also, the regional number routine of S745 and S935 of the first embodiment are not performed in the sound present routine shown in FIG. 10 and the silent routine shown in FIG. 11, respectively. It should be noted that the regional number routine added to the recording routine in S415 is the same as represented by the flowchart in FIG. 8.

It will be remembered that in the regional number routines of S745 and S935 of the first embodiment, before connecting the telephone line and dialing a telephone number, a telephone number stored in the DRAM 21 is retrieved therefrom and either the regional number portion is removed from or added to the head of the telephone number under consideration, depending on whether the telephone number has a regional number that matches or differs from the present regional number.

However, with the configuration of the second embodiment, these operations are performed in S415 directly before a caller's telephone number is stored in the DRAM 21. That is, in S415 either the regional number portion is removed from subject telephone numbers with a regional number that matches the present regional number or an external region call number is added to the head of subject telephone numbers with a regional number that differs from the present regional number and then the subject telephone numbers are stored in the DRAM 12.

Therefore, in the second embodiment, a telephone numbers including the present regional number will already be without its regional number when it is retrieved from the DRAM 21 as the result of an automatic dial command to call the telephone number. As a result, problems, such as not being able to place a call or being charged a higher rate, will not occur when the telephone number stored in the DRAM 21 is dialed in S760 or S960. Also, less memory of the DRAM 21 will be required to store telephone numbers because those for the present region, that is, with the present regional number, will be stored with their regional number portion removed.

Also, because an external region call number is added to the front of those telephone numbers having a regional number that differs from the present telephone number, telephone calls can be placed in countries where such an external region call number is necessary. Of course, in countries where no such number is required, addition of an external region call number can be prevented by setting the telephone 1 so that it does not add an external region call number or merely by not registering any external region call number.

It should be noted that unlike in the first embodiment, should the telephone 1 of the second embodiment or its internal data be taken to and used in another region, there is a danger that it can not be used as is. In such a case, the regional number of each telephone number for each party can be corrected in a single sitting. However, adding the following processes to S254 would be simpler and more effective.

That is, when a user depresses numeric keys to input a new regional number as a new present regional number, during the regional number registration routine of S254 all telephone numbers stored in the DRAM 21 are searched to find those having had their regional numbers erased. Then processes are performed to add the old regional number, which is stored in the DRAM 23 and which was used as the present regional number up until now, to telephone numbers with no regional number. Then, all telephone numbers stored in the DRAM 21 are again searched to find those telephone numbers that include the newly inputted regional number. Processes are then performed to remove the newly inputted regional number from telephone numbers including the newly inputted regional number. Then the newly inputted regional number is registered in the DRAM 23 as the present regional number.

While the invention has been described in detail with reference to specific embodiments thereof, it would be apparent to those skilled in the art that various changes and modifications may be made therein without departing from the spirit of the invention, the scope of which is defined by the attached claims.

For example, although in the first embodiment, the regional number routine of S745 is performed between S740 and S750, it could be performed between S730 and S740 or between S750 and S760. Similarly, although in the first embodiment the regional number routine of S935 is performed between S930 and S950, it could be performed between S950 and S960.

In S840 and S1040 of the first embodiment, a caller's telephone number stored in the DRAM 21 in correspondence with an incoming message under consideration is registered as a telephone number that can be automatically dialed. Because processes for removing the present regional number or for adding an external region call number have not been performed on thus-registered telephone numbers, telephone calls using such telephone numbers are made after the same regional number routine of S745 and S935 is performed. In the second embodiment, processes for removing the present regional number or for adding a registration region external call number have already been performed on telephone numbers while they were being stored in the DRAM 21 so there is no need to perform these processes again when a telephone call is made using these telephone numbers.

However, when the present regional number stored in the DRAM 23 is corrected because the telephone 1 is moved to another region, those telephone numbers registered without a regional number are automatically provided with the old present regional number as describe above and, in addition, can also be provided with a registration region external call number. After this correction is completed, those telephone numbers including the new regional number can be subjected to processes for removing the regional number portion and also the registration region external call number.

Also, in the first and second embodiments, the regional number routine is performed on telephone numbers included in caller-IDs. That is, in the first embodiment, the regional number routine is performed directly before placing a telephone call using telephone numbers included in caller-IDs and stored in the DRAM 21. In the second embodiment, when a caller-ID is received while the telephone 1 is set to its answering machine mode, the regional number routine is performed on telephone numbers included in the caller-ID and the resultant telephone number is stored in the DRAM 21.

However, the present invention can be used for telephone numbers other than those obtained from a caller-ID and can be used on data of telephone numbers obtained using other methods. For example, a user can directly input the telephone numbers. Further, regional number routine can be performed on the telephone number included in, for example, a caller-ID received during normal reception or other condition, not only when the telephone 1 is set to its answering machine mode. The resultant telephone number could then be stored in the DRAM 21. Also, when a caller dials a telephone number, that is, during normal telephone processes, the regional number routine can be performed directly before a call is made. It should be noted that the regional number routine need not be performed automatically. Instead, a caller's telephone number a user wants to call or register can be displayed so that the user can modify it if necessary during calling or registration of a caller's telephone number.

It should be noted that in the first and second embodiments, when an incoming message is reproduced, a caller's telephone number corresponding to the incoming message is displayed. In other words, the same command was used to reproduce the incoming message and to display the caller's telephone number. However, a special key for commanding display of the caller's telephone number stored in the DRAM 21 could be provided to the operation panel so that each time a user depresses the special key, the caller's telephone numbers would be displayed in the order stored. In this case also, by looking at the displayed telephone numbers, the user can tell who called regardless of whether the caller left a message.

Also, in the first and second embodiment, when the telephone 1 is set to its answering mode, caller's telephone numbers are stored in order received and can be displayed afterward. However, the telephone 1 can be designed so that even when set to its normal reception mode, wherein reception is not automatically undertaken, callers' telephone numbers transmitted with a ringing signal are stored in order received in the DRAM 21 and then displayed each time a predetermined key is depressed.

In this way, a user can know that a calling party is calling for some purpose without picking up the handset 35. In this way, the calling party will not be charged for the call. Also, even when the telephone 1 is not set to its answering machine mode, a user will know who called while he or she was away from the telephone 1. This would be very convenient for business people.

What is claimed is:

1. A telephone comprising:

a telephone number memory for storing telephone numbers;

a present regional number memory for storing a present regional number of the telephone itself;

telephone number selection means for selecting, from the telephone numbers stored in the telephone number memory, a telephone number indicated by a user;

regional number removal means for automatically removing a regional number portion from the telephone number selected by the telephone number selection means each time the regional number portion matches the present regional number stored in the present regional number memory; and caller means for performing calling processes using the telephone number after the telephone number is processed by the regional number removal means.

2. A telephone as claimed in claim 1 further comprising:

external region call number addition means for adding, to the telephone number, an external region call number, indicating that the telephone number is from an external region, when the regional number portion of the telephone number does not match the present regional number stored in the present regional number memory; and wherein the caller means performs calling processes using one of the telephone number after the regional number removal means removes the regional number portion therefrom and the telephone number after the external region call number addition means adds the external region call number thereto.

3. A telephone as claimed in claim 2, further comprising:

reception means for receiving transmissions transmitted over a telephone line;

telephone number extraction means for extracting a caller's telephone number from a transmission with a ringing signal transmitted over the telephone line; and caller's telephone number registration means for registering, in the telephone number memory, the caller's telephone number extracted by the telephone number extraction means.

4. A telephone as claimed in claim 1, further comprising:

reception means for receiving transmissions transmitted over a telephone line;

telephone number extraction means for extracting the caller's telephone number from a transmission with a ringing signal received by the reception means; and caller's telephone number registration means for registering, in the telephone number memory, the caller's telephone number extracted by the telephone number extraction means.

5. A telephone as claimed in claim 4, further comprising:

display means for displaying telephone numbers registered in the telephone number memory by the caller's telephone number registration means.

6. A telephone as claimed in claim 4, further comprising:

incoming message recording means for recording an incoming message transmitted in the transmission received by the reception means.

7. A telephone as claimed in claim 6, further comprising:

non-voice erasure means for erasing a non-voice portion from the incoming message recorded by the incoming message recording means records.

8. A telephone as claimed in claim 6, wherein the caller's telephone number registration means registers the caller's telephone number in correspondence with the incoming message.

9. A telephone as claimed in claim 8, further comprising:

play means for reproducing the incoming message; and display means for displaying the telephone number registered in correspondence with the incoming message being reproduced by the play means.

10. A telephone comprising:

a telephone number memory for storing telephone numbers;

a present regional number memory for storing a present regional number of the telephone itself;

input means for performing input processes to store a telephone number in the telephone number memory means;

regional number removal means for removing a regional number portion from the telephone number inputted via the input means when the regional number portion matches the present regional number; and telephone number registration means for registering, in the telephone number memory, the telephone number after the telephone number is processed by the regional number removal means.

11. A telephone as claimed in claim 10, further comprising:

telephone number selection means for selecting, from the telephone numbers stored in the telephone number memory, a selected telephone number corresponding to one indicated by a user; and caller means for performing calling processes using the selected telephone number selected by the telephone number selection means.

12. A telephone as claimed in claim 11, further comprising:

external region call number addition means for adding, to the selected telephone number, an external region call number, indicating that the selected telephone number is from an external region, when a regional number portion of the telephone number does not match the present regional number stored in the present regional number memory; and wherein the caller means performs calling processes using one of the selected telephone number after the regional number removal means removes the regional number portion therefrom and the selected telephone number after the external region call number addition means adds the external region call number thereto.

13. A telephone as claimed in claim 10, further comprising:

new regional number input means for inputting a new regional number for the telephone itself;

present regional number replacement means for searching all telephone numbers stored in the telephone number memory and replacing the present regional number to telephone numbers having had their regional number removed by the regional number removal means; and new regional number removal means for searching all telephone numbers stored in the telephone number memory and removing a regional number portion from telephone numbers including the new regional number input by the new regional number input means.

14. A telephone as claimed in claim 13, wherein the input means extracts and inputs a caller's telephone number transmitted with a ringing signal over a telephone line.

15. A telephone as claimed in claim 10, wherein the input means extracts and inputs a caller's telephone number transmitted with a ringing signal over a telephone line.

16. A telephone as claimed in claim 1, further comprising:

reception means for receiving transmissions transmitted over a telephone line;

telephone number extraction means for extracting the caller's telephone number from a transmission with a ringing signal received by the reception means;

caller's telephone number registration means for registering, in the telephone number memory, the caller's telephone number extracted by the telephone number extraction means; and incoming message recording means for recording an incoming message transmitted in the transmission received by the reception means;

wherein the caller's telephone number registration means registers the caller's telephone number in correspondence with the incoming message.

17. A telephone as claimed in claim 10, further comprising reception means for receiving transmissions transmitted over a telephone line;

telephone number extraction means for extracting the caller's telephone number from a transmission with a ringing signal received by the reception means;

caller's telephone number registration means for registering, in the telephone number memory, the caller's telephone number extracted by the telephone number extraction means; and incoming message recording means for recording an incoming message transmitted in the transmission received by the receptions means;

wherein the caller's telephone number registration means registers the caller's telephone number in correspondence with the incoming message.

18. A telephone as claimed in claim 1, further comprising reception means for receiving transmissions transmitted over a telephone line;

incoming message recording means for recording an incoming message transmitted in the transmission received by the reception means; and non-voice erasure means for erasing a non-voice portion from the incoming message recorded by the incoming message recording means.

19. A telephone as claimed in claim 10, further comprising:

reception means for receiving transmissions transmitted over a telephone line;

incoming message recording means for recording an incoming message transmitted in the transmission received by the reception means; and non-voice erasure means for erasing a non-voice portion from the incoming message recorded by the incoming message recording means.

* * * * *